(12) United States Patent
Gurvich et al.

(10) Patent No.: US 12,253,107 B2
(45) Date of Patent: Mar. 18, 2025

(54) DRIVE SHAFTS WITH ENHANCED BENDING FLEXIBILITY

(71) Applicant: Hamilton Sundstrand Corporation, Charlotte, NC (US)

(72) Inventors: Mark R. Gurvich, Middletown, CT (US); Georgios S. Zafiris, Glastonbury, CT (US); Joyel M. Schaefer, Earlville, NY (US); Brayton Reed, Rome, NY (US); Michael King, Sauquoit, NY (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 1111 days.

(21) Appl. No.: 16/247,856

(22) Filed: Jan. 15, 2019

(65) Prior Publication Data

US 2020/0224710 A1   Jul. 16, 2020

(51) Int. Cl.
*F16C 1/02* (2006.01)
*F16C 3/02* (2006.01)

(52) U.S. Cl.
CPC .......... *F16C 1/02* (2013.01); *F16C 3/02* (2013.01); *F16C 2240/60* (2013.01); *F16C 2326/06* (2013.01)

(58) Field of Classification Search
CPC .......... F16C 1/02; F16C 3/02; F16C 2240/60; F16C 2326/06; F16C 2220/40; F16C 2220/42; F16C 3/18; F16C 3/00; F16D 3/50
USPC .......... 464/183, 180, 181, 182, 78; 267/181; 138/DIG. 11
See application file for complete search history.

(56) References Cited

U.S. PATENT DOCUMENTS

| 4,173,128 | A | | 11/1979 | Corvelli |
| 4,330,142 | A | * | 5/1982 | Paini |
| 5,429,574 | A | | 7/1995 | Murakami |
| 5,439,035 | A | * | 8/1995 | Dal Palu e,acu uAttilio |
| 5,894,753 | A | | 4/1999 | Sachot et al. |
| 6,015,350 | A | * | 1/2000 | Breese .......... 464/183 |
| 6,695,705 | B2 | | 2/2004 | Stervik |
| 7,637,539 | B2 | * | 12/2009 | McKee |
| 8,104,963 | B2 | * | 1/2012 | Hibi |
| 9,458,958 | B2 | * | 10/2016 | Kury |
| 9,909,624 | B2 | | 3/2018 | Narayanan Nampy et al. |
| 2011/0124422 | A1 | * | 5/2011 | Horen .......... F16C 3/02 464/183 |
| 2012/0283029 | A1 | | 11/2012 | Lawrie |
| 2014/0137700 | A1 | | 5/2014 | Fiedler et al. |

FOREIGN PATENT DOCUMENTS

GB   2242959 A   10/1991
WO   2014/127352 A1   8/2014

OTHER PUBLICATIONS

European Search Report for EP Application No. 19207528.1 dated May 18, 2020.

* cited by examiner

*Primary Examiner* — William S. Choi
(74) *Attorney, Agent, or Firm* — Carlson, Gaskey & Olds, P.C.

(57) ABSTRACT

A drive shaft has a tubular portion extending between axial ends and is hollow. There are deformations on the tubular portions. The deformations extend for a circumferential extent that is less than 180° about a central axis of the tubular portion.

13 Claims, 11 Drawing Sheets

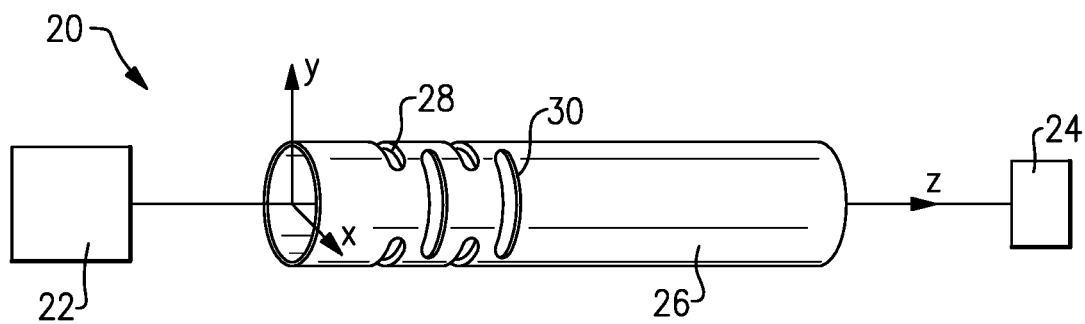
FIG.1
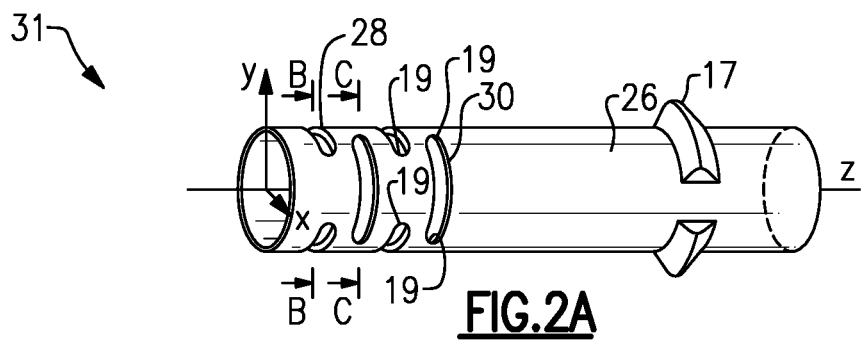
FIG.2A
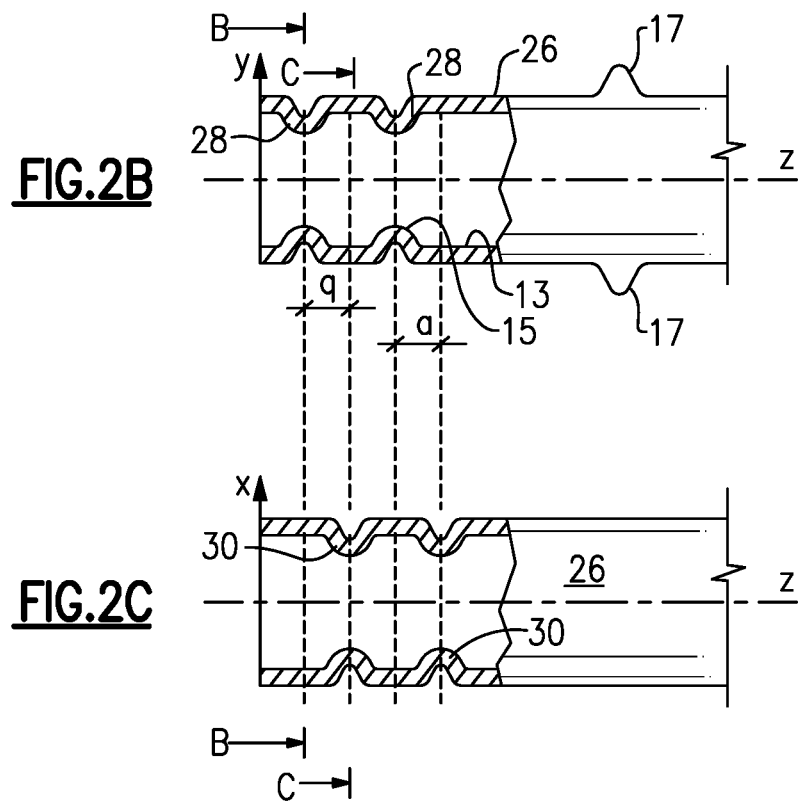
FIG.2B
FIG.2C

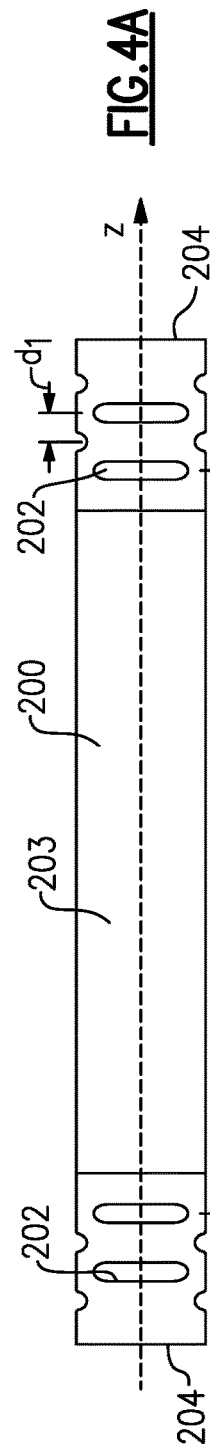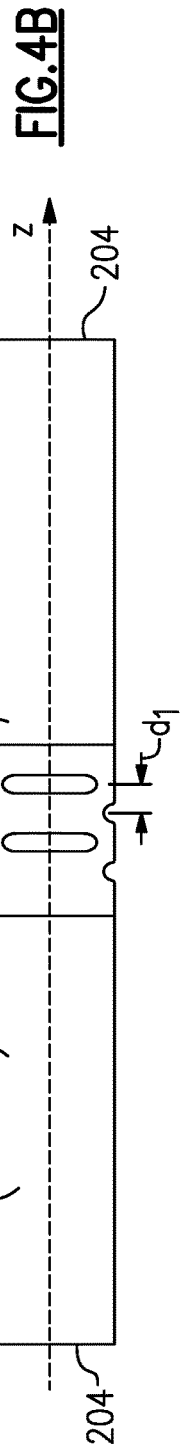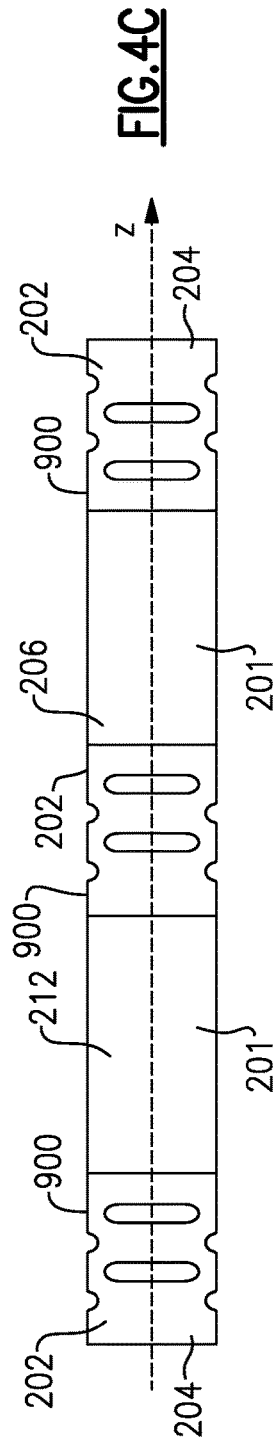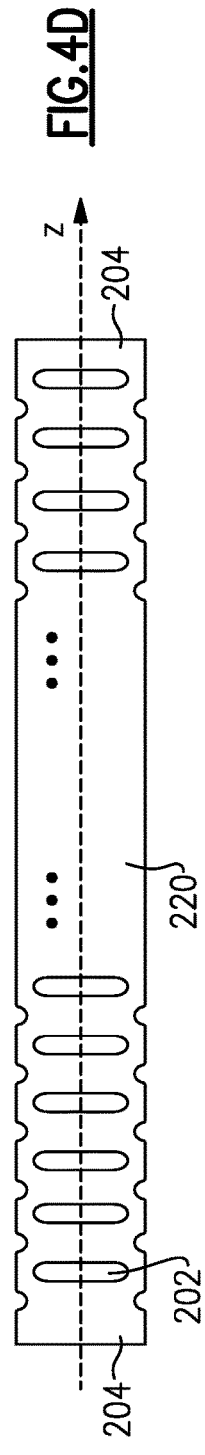

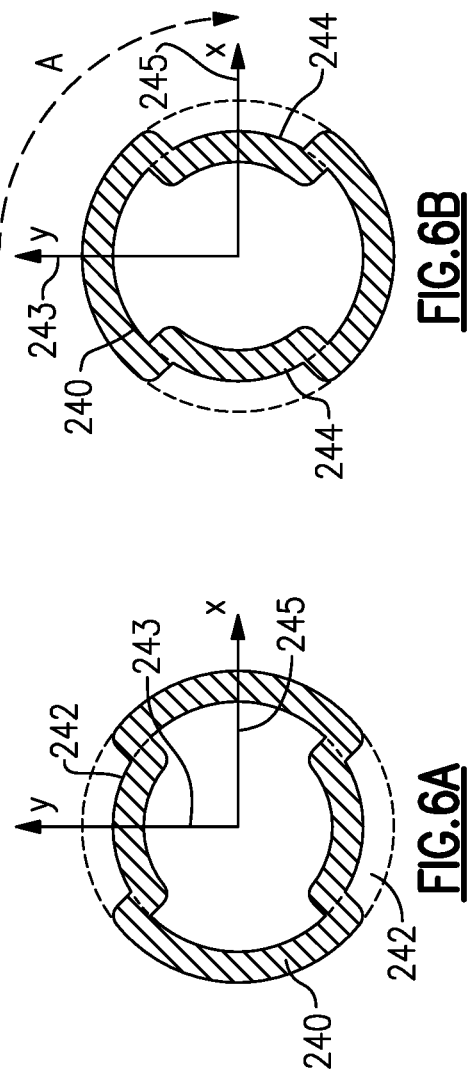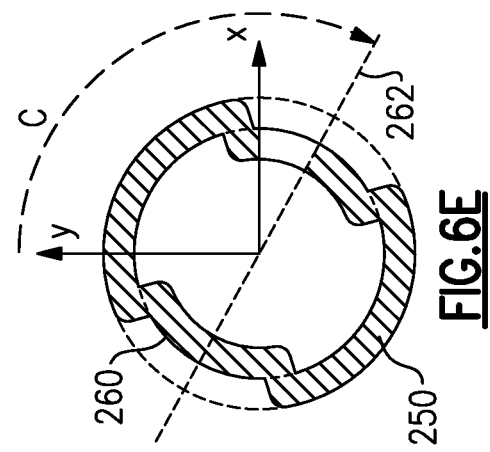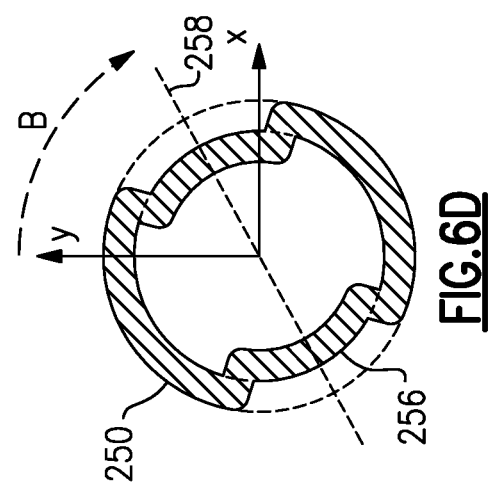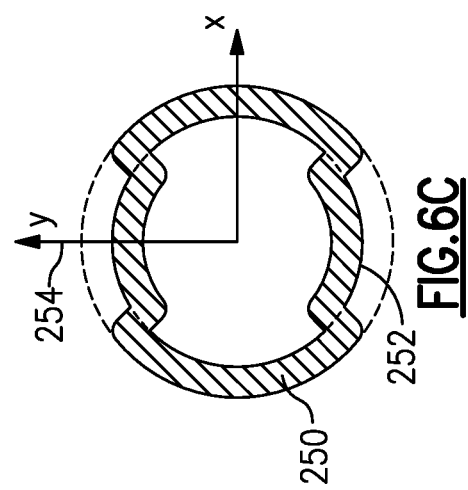

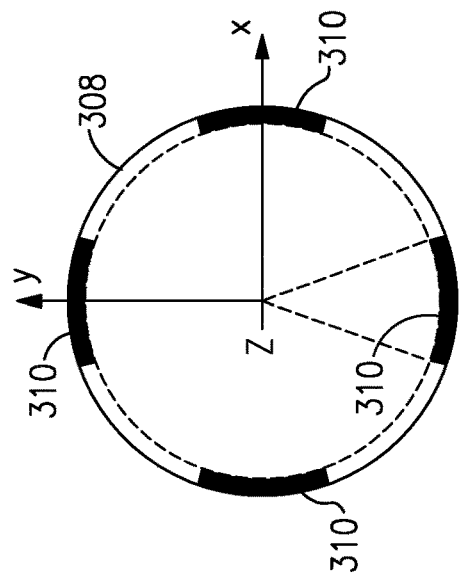
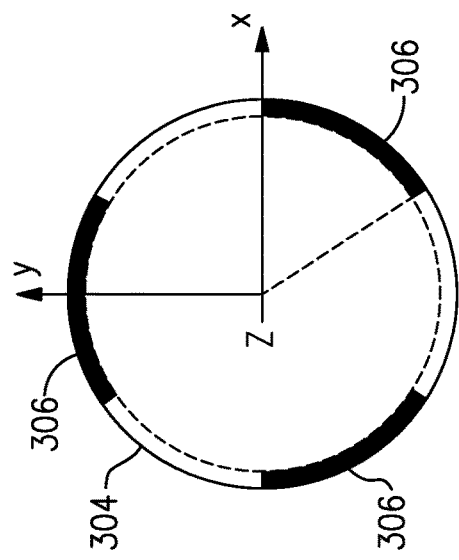
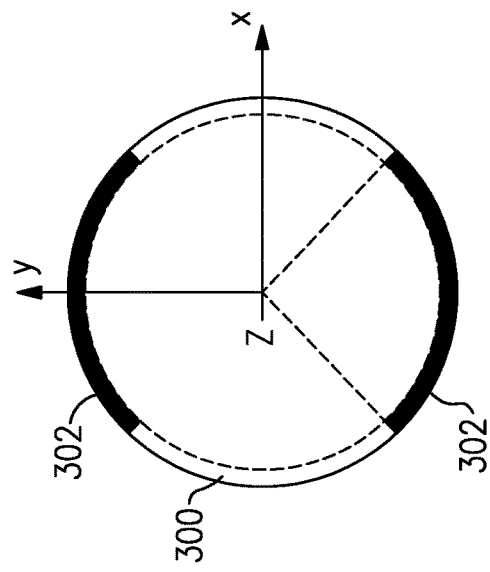

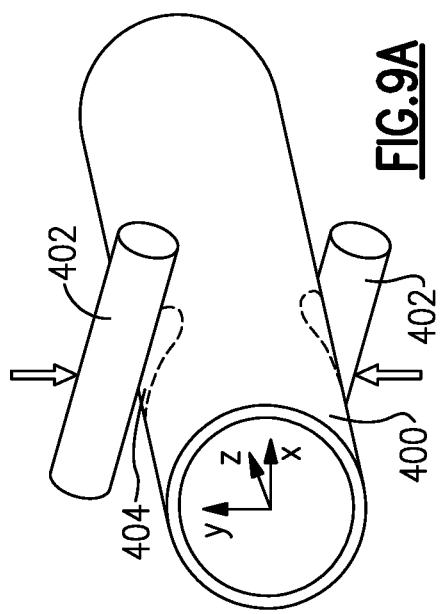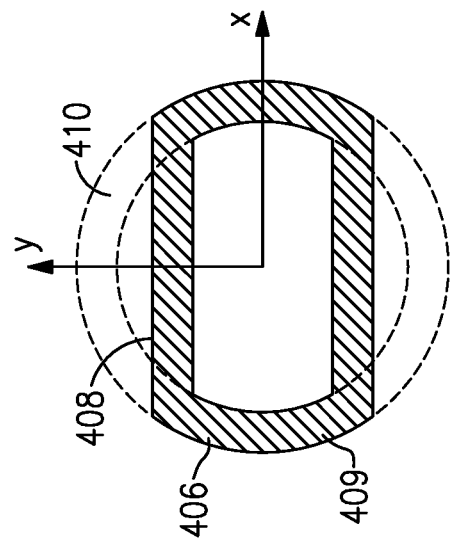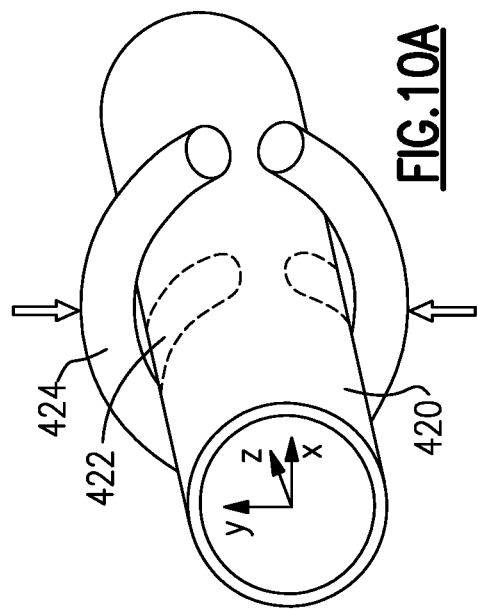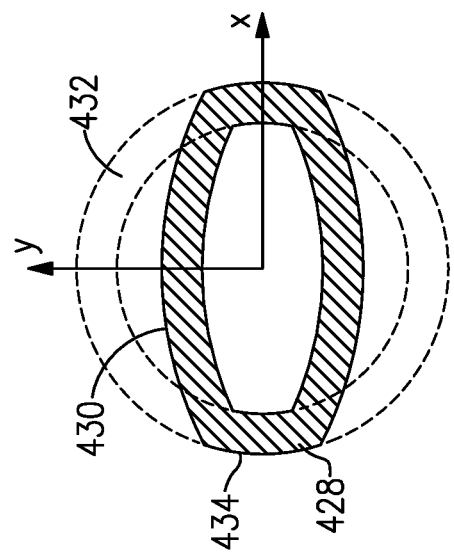

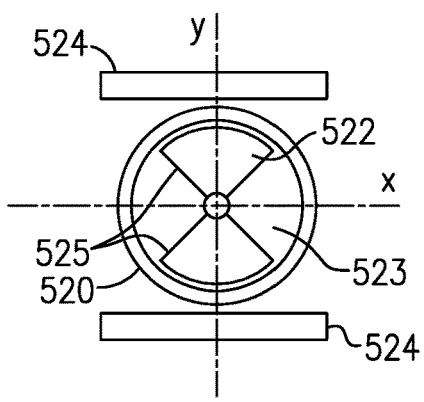
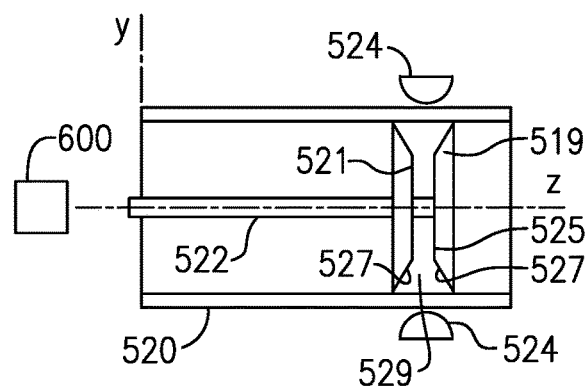
FIG.12A   FIG.12B
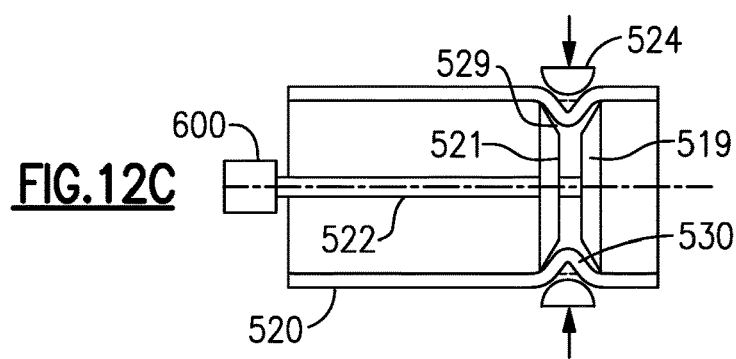
FIG.12C
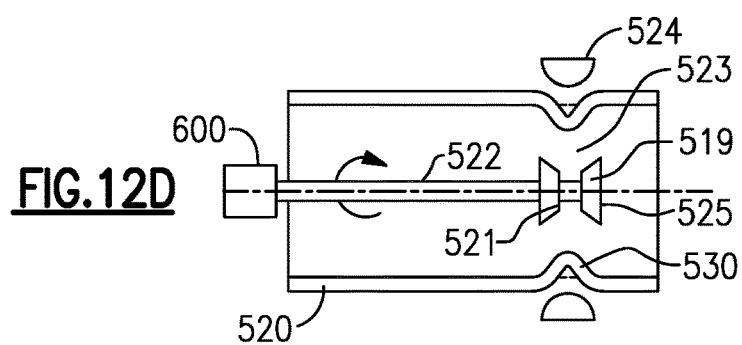
FIG.12D
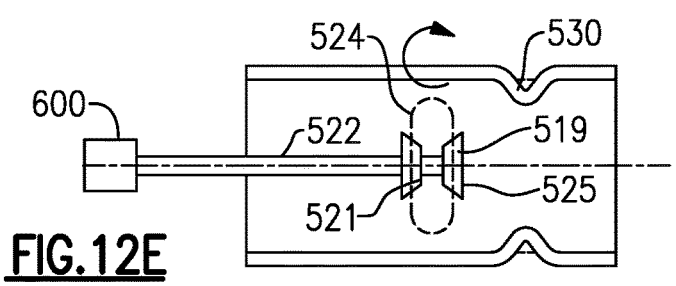
FIG.12E

DRIVE SHAFTS WITH ENHANCED BENDING FLEXIBILITY

BACKGROUND

This application relates to drive shafts with enhanced flexibility.

Drive shafts are utilized in any number of applications. Typically, a drive shaft connects a source of drive to an item to be driven. Drive shafts are utilized in aerospace applications. One particular application is to drive propellers such as are associated with a helicopter. It is known that the drive shaft input might become misaligned with the drive shaft output during operation. Thus, some flexibility is desirable along the drive shaft.

Drive shafts have historically been provided as a single tubular member with flexible diaphragms at each end to allow for some flexibility between the input and the output.

It is also known, as an alternative (or in addition) to the use of diaphragms, to utilize grooves which extend across 360° on the shaft to provide for the flexibility. A similar concept has been utilized from outwardly extending bump on the drive shaft.

SUMMARY

A drive shaft has a tubular portion extending between axial ends and is hollow. There are deformations on the tubular portions. The deformations extend for a circumferential extent that is less than 180° about a central axis of the tubular portion.

These and other features may be best understood from the following drawings and specification.

BRIEF DESCRIPTION OF THE DRAWINGS

FIG. 1 shows a drive shaft in an application somewhat schematically.

FIG. 2A shows a three-dimensional view of a drive shaft portion.

FIG. 2B is an axial cross-sectional view through a portion of the FIG. 2A drive shaft.

FIG. 2C is an axial cross-sectional view through a distinct portion of the FIG. 2A drive shaft.

FIG. 4A shows one alternative distribution of grooves or detents along a tube axis Z.

FIG. 4B shows a second alternative distribution of grooves or detents along a tube axis Z.

FIG. 4C shows a third alternative distribution of grooves or detents along a tube axis Z.

FIG. 4D shows yet another alternative distribution of grooves or detents along a tube axis Z.

FIG. 6A shows one option in a diametric cross-sectional view

FIG. 6B shows an option associated with FIG. 6A.

FIG. 6C shows another option in a diametric cross-sectional view.

FIG. 6D shows an option associated with FIG. 6C.

FIG. 6E shows another part of the FIGS. 6C and 6D option.

FIG. 7A shows one embodiment of an arrangement of grooves or detents along a hoop direction in a representative diametric cross-section.

FIG. 7B shows an alternative feature of an arrangement of grooves or detents along a hoop direction in a representative diametric cross-section.

FIG. 7C shows yet another alternative of an arrangement of grooves or detents along the hoop direction in a representative diametric cross-section.

FIG. 9A shows a three-dimensional view of a fabrication step.

FIG. 9B shows a diametric cross-sectional view with grooves formed by the fabrication method schematically illustrated in FIG. 9A.

FIG. 10A shows an alternative three-dimensional view of a fabrication step.

FIG. 10B shows a diametric cross-sectional view with grooves or detents formed by the fabrication method schematically illustrated in FIG. 10A.

FIG. 12A shows a diametric cross-section of the first arrangement.

FIG. 12B shows an axial cross-sectional view of a first step in a method of forming a drive shaft.

FIG. 12C shows a subsequent step.

FIG. 12D shows yet another subsequent step.

FIG. 12E shows yet another subsequent step.

DETAILED DESCRIPTION

Figure 3A:
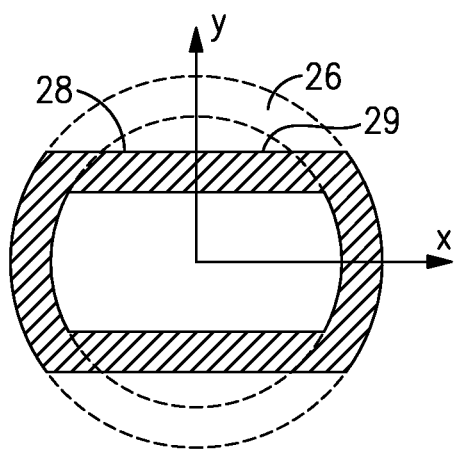
FIG. 3A is a diametric cross-sectional view along section B-B from the FIG. 2B location.

FIG. 1 shows a drive arrangement 20, which drives a component 22 through a drive input 24, and having a drive shaft 26 connecting the input 24 to the output 22. A plurality of grooves or detents 28 and 30 are formed on an outer peripheral surface of a shaft portion 26. The grooves 28 and 30 extend for a limited circumferential length about an axis of rotation Z of the drive shaft 26. In fact, the grooves 28 and 30 extend for less than 180° about the axis of rotation Z.

FIG. 2A shows a tubular portion 31 of the shaft 26 having the grooves or detents 28 and 30. While grooves are specifically disclosed with regard to the apparatus features of this disclosure, bumps 17 such as mentioned above which extend radially outwardly can be substituted for the grooves in all embodiments.

FIG. 2B is a cross-sectional view through space portions of the repeated grooves 28. FIG. 2C is a cross-sectional view through the grooves 30. As can be appreciated from FIGS. 2A-2C, groove sets are positioned in general alignment, but spaced axially from each other. Thus, as one can see from FIGS. 2A-2C, the circumferential extent of the grooves 30 extends across a space between ends 19 of spaced grooves 28. The grooves 28 also extend through a space between the ends 19 of the grooves 30. In some embodiments, the ends 19 of the grooves 30 may extend circumferentially beyond the ends 19 of the grooves 28, and vice versa. In other embodiments, the ends 19 of the grooves 30 and the ends 19 of the grooves 28 may end before the circumferential location of the other ends 19.

As shown, it could be said the deformations include at least two axially spaced deformation sets, with a first set having deformations between first set circumferential ends and a second set extending between second set circumferential ends. Deformations in the second set extend at least partially into a circumferential space between the first circumferential ends As is clear the grooves deform a wall of the preform, but do not cut, or extend, through to an inner surface. As is clear from FIG. 2B, the grooves or detents 28 (although this is also true of the detents 30, and the other detents to be disclosed below) also deform an inner peripheral surface 13 of the tubular portion 31. The groove 28 is showing having an inwardly extending portion 15 deformed into the inner surface 13. On the other hand, it may be that the deformations need not extend through the entire thickness of the tubular portion 31, and do not deform, say, the inner surface 13.

Figure 3B:
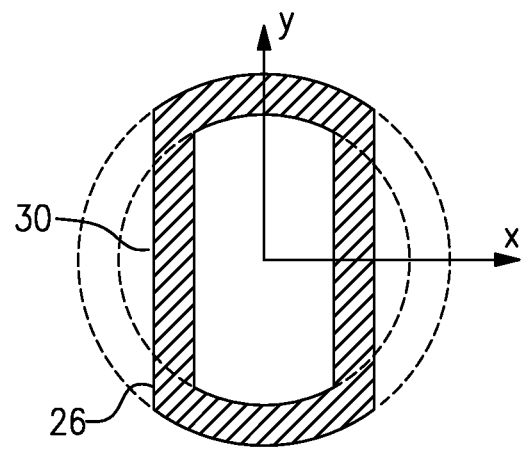
FIG. 3B is a diametric cross-sectional view along section C-C from the FIG. 2C location.

FIG. 3A shows diametric cross-section with an embodiment of a groove 28 that is relatively flat at an outer surface 29. FIG. 3B shows a similar shape to the outer surface 29 of the groove 30.

Figure 3C:
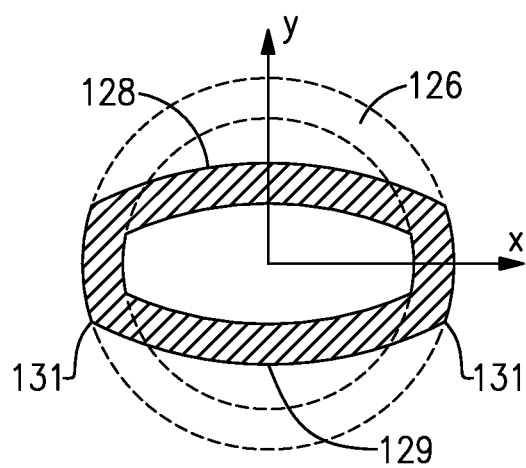
FIG. 3C is an alternative view similar to that of FIG. 3A.

FIG. 3C shows diametric cross-section with a more complex shape for a groove 128 on a drive shaft 126. Here, shape 128 has as an outermost position 129 extending to circumferential ends 131. As is clear, the deformations are formed to have a central location 129 which extends radially further away from the central axis, and the circumferential ends 131 extend in a circumferential direction toward each other.

Figure 3D:
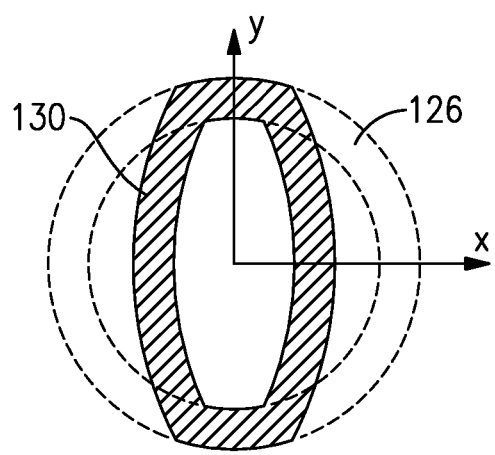
FIG. 3D is an alternative view similar to that of FIG. 3B.

FIG. 3D has a similar shape for a groove 130.

FIG. 4A shows a first embodiment wherein there is a drive shaft 200 having a portion 203 in a central location that is generally without grooves. Portions adjacent ends 204 have groove sets 202. There are at least a plurality of grooves 202 adjacent the ends 204 spaced by a distance $d_1$. The spacing distances $d_1$ can be either the same or variable in the grooved areas. It could be said that a spacing distance $d_1$ between the grooves 202 at the end portions is less than a distance $d_2$ between grooves across the non-groove section 203 having fewer grooves.

FIG. 4B shows a drive shaft embodiment 210 wherein a pair of non-groove portions 203 and 206 extend between the ends 204 of the drive shaft. An area with grooves 202 is shown at an intermediate location. Here again, a distance $d_1$ between a plurality of grooves in the grooved area is less than a distance between grooves in the non-grooved areas 210. The distance $d_2$ here is also greater than $d_1$.

FIG. 4C shows a drive shaft 212 having non-grooved areas 201 with end groove portions 900 and a central groove portion 900. Here again, a distance between a plurality of grooves in each of the grooved portions 900 is less than a distance between grooves across the portions 201.

FIG. 4D shows a drive shaft 220 wherein the grooves 202 are formed by uniform or variable spacing across an axial length of the drive shaft and between the axial ends 204.

Figure 5B:
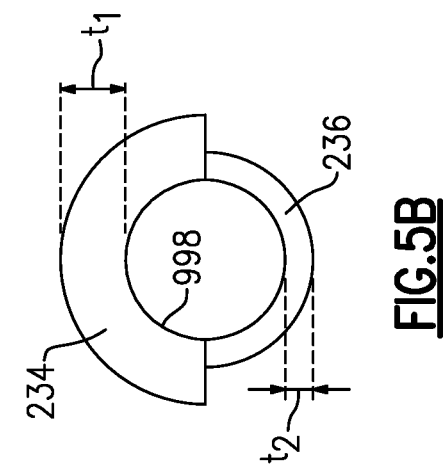
FIG. 5B is a diametric cross-sectional view along section 5B-5B from FIG. 5A.
Figure 5A:
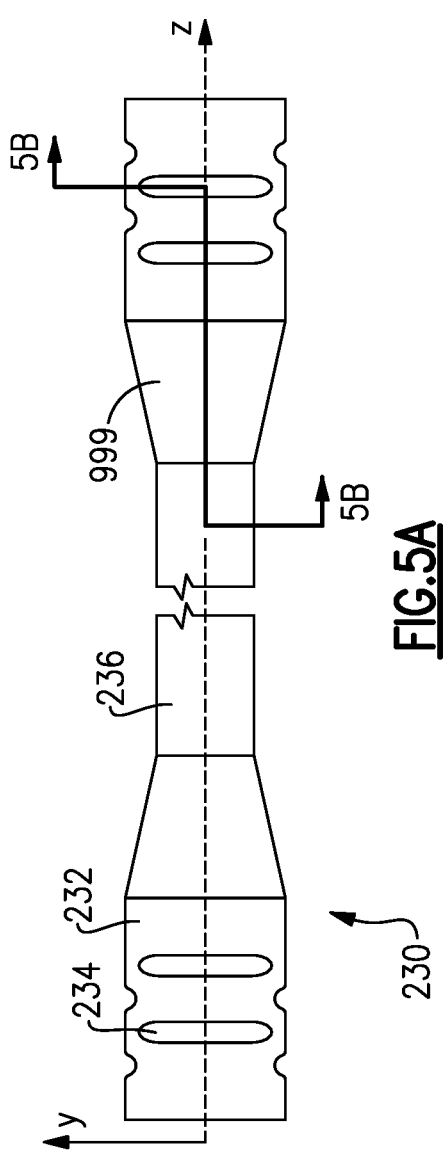
FIG. 5A shows an optional feature.

FIG. 5A shows another potential feature wherein a drive shaft 230 has a central portion 236 which is relatively small, and end portions 232 having grooves 234 such as disclosed above. Portions 232 are either radially larger or/and thicker than the central portion 236.

As shown in FIG. 5B, this may be accomplished by either simply having the outer diameter of the portion 234 be larger than the outer diameter of the portion 236 while keeping the inner diameter 998 of the portions 236 and 234 constant. In this case, a thickness $t_1$ of the portion 234 is greater than a radial thickness $t_2$ of the portion 236. This will provide reinforcement to the area with grooves to mitigate stress concentrations due to the grooves. The groove or detent 234 is omitted from this view to simplify the section and better illustrate the relative diameters and/or thicknesses.

Figure 5C:
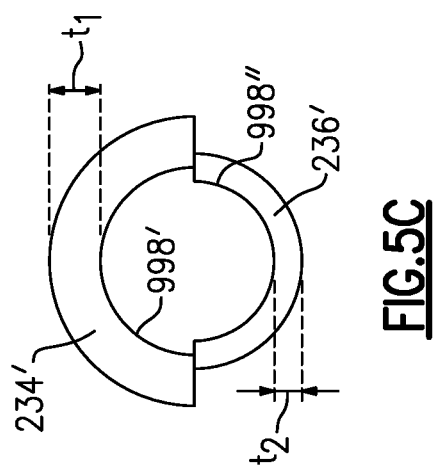
FIG. 5C is another alternative view similar to that of FIG. 5B.

FIG. 5C shows another embodiment wherein the thickness $t_1$ and $t_2$ of the sections 234' and 236' may be different and their inner diameters 998' and 998" are also different. It should be understood that the inner diameter 998 between the two sections will change in a linear or non-linear fashion as one moves from the two cross-sections of FIG. 5B. That is, in the section 999 as shown in FIG. 5A, the inner diameter will slope to accommodate the differences between the two sections 234' and 236'.

FIGS. 6A and 6B show an embodiment 240 much like that illustrated above with regard to FIG. 1 wherein an embodiment 240 much like that illustrated in FIG. 1 wherein there are two groove sets 242 and 244.

FIG. 6A shows the first groove set 242 on the shaft 240 wherein the grooves 242 are centered on the axis 243.

FIG. 6B shows the second groove set 244 on the shaft 240 wherein the grooves 244 are centered on an axis 245. An angle A is defined between the axes 243 and 245, and the angle A may be approximately 90°.

FIG. 6C shows a drive shaft embodiment 250 having a pair of grooves 252 centered on an axis 254. In embodiment 250, there are not two axially spaced sets of grooves, but rather three.

FIG. 6D shows grooves 256 centered on axis 258. An angle B is defined between axes 254 and 258, and the angle B may be approximately 60°.

FIG. 6E shows another axially spaced cross-section of the drive shaft 250 wherein there are grooves 260 centered on an axis 262. Axis 262 is spaced from axis 243 by an angle C. Angle C may be approximately 120°, i.e., approximately twice larger than the angle B.

Embodiments with more than three sets of grooves may be used.

FIG. 7A shows a first embodiment shaft 300 wherein there are two grooves 302 at each axial location in each groove set.

FIG. 7B shows an alternative drive shaft embodiment 304 wherein there are three circumferentially spaced grooves 306 in each groove set.

FIG. 7C shows a drive shaft embodiment 308 wherein there are four circumferentially spaced grooves 310 at each axial location in each groove set.

Of course more than four circumferentially spaced grooves could be used in each axially spaced deformation set.

The arrangement of grooves circumferentially about a shaft axis Z is similar to the arrangement when only two grooves per the section are used. For example if there are two uniformly positioned grooves shown in FIG. 7A, a diametric complimentary cross-section (FIG. 3B) a rotated at approximately 90°. Similarly in case of three the same, uniformly positioned grooves (FIG. 7B), there is a corresponding cross-section rotated at 60°. In case of four (FIG. 7C), uniformly positioned grooves, there is a similar rotation at 45°, and so on. More complex, but similar mutual arrangements can be defined if there are more than two complimentary sets of grooves, for example of a case shown in FIGS. 6C-6E for three complimentary sets.

Figure 8A:
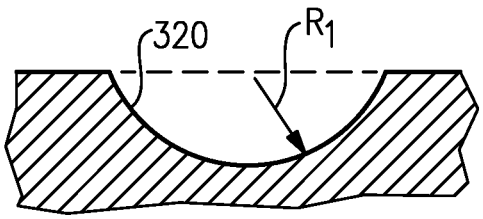
FIG. 8A shows one potential embodiment of a groove or detent cross-sectional shape.

FIG. 8A shows a first cross-sectional shape 320 for an individual groove presented in an axial cross-section of the shaft (that is, similar to the FIG. 2B section). Cross-sectional shape 320 has a generally uniform or non-uniform but concave shape and constant or variable radius $R_1$.

Figure 8B:
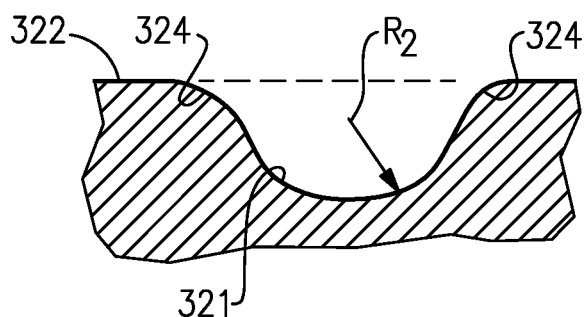
FIG. 8B shows an alternative embodiment of a groove or detent cross-sectional shape.

FIG. 8B shows an alternative shape 322 wherein there is a central concave portion 321 formed about a constant or variable radius $R_2$. There are also convex portions 324 on each side of the portion 321. These convex segments 324 spaced on each end of the concave portion.

Figure 8C:
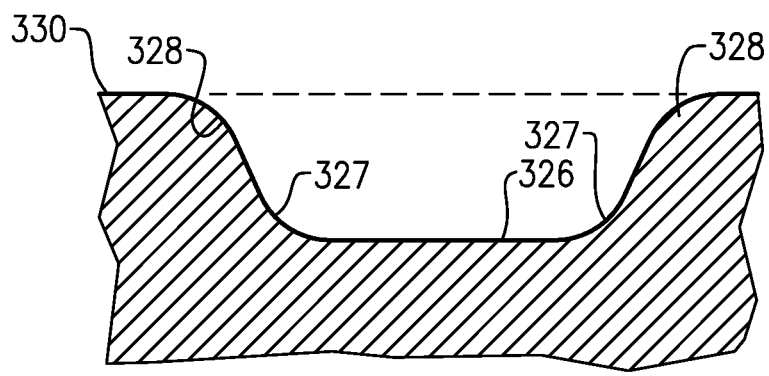
FIG. 8C shows yet another alternative embodiment of a groove or detent cross-sectional shape.

FIG. 8C shows another alternative groove shape 330 having a flat portion 326, convex end portions 328 at each end of the groove, and concave portions 327.

A drive shaft could be said to comprise a tubular portion extending between axial ends and being hollow. Deformations are formed from an outer peripheral surface of the cylindrical shaft portion. The deformations extend for a circumferential extent that is less than 180° about a central axis of the tubular portion.

The shafts as disclosed above may be formed of the same or different fiber-reinforced polymer matrix composite materials. In one embodiment, the matrix can be a thermoplastic polymer. In another embodiment, the matrix can be a thermoset polymer composite. Different types of reinforcing fibers, such as, for example, carbon fibers, glass fibers, organic fibers, inorganic material (e.g. ceramic) fibers, or their combinations can be used in different embodiments. In different embodiments, the same or different fabrication processes, such as for example, automated fiber placement, filament winding, braiding, wrapping, etc. can be used to make separate composite tubes and diaphragms. Alternatively, this disclosure would also extend to metal shafts.

A method of forming such shafts is now disclosed.

FIG. 9A shows a tubular portion formed of a thermoplastic shaft preform. Heated molds 402 are brought into contact with compression against the tubular preform 400 to form the grooves 404. Although heated molds are disclosed, with certain materials the molds need not be heated. As an example if a thermoplastic is used heated molds may be used. The molds need not be heated when a thermoset or metal is used. As an example, a mold may be brought into contact with a partially curved thermoset polymer composite preform shaft.

As shown in this embodiment, the molds are generally cylindrical. However, in particular and as an example only, the several shapes of the grooves or detents, as disclosed above, could inform the shape of the molds.

FIG. 9B shows diametric cross-sectional view of a shaft 406 having the grooves 408 formed to be generally flat and extending between circumferentially spaced curved ends 409. This embodiment would be similar to that illustrated in FIGS. 3A and 3B.

FIG. 10A shows a shaft preform 420 receiving molds 424, which have a curvature to them, and which form the groove areas 422.

As shown in FIG. 10B for a diametric cross-sectional view of a shaft 420, the grooves 430 on the formed shaft 428 extend between cylindrical ends 434. This embodiment would be similar to that illustrated in FIGS. 3C and 3D.

Figure 11:
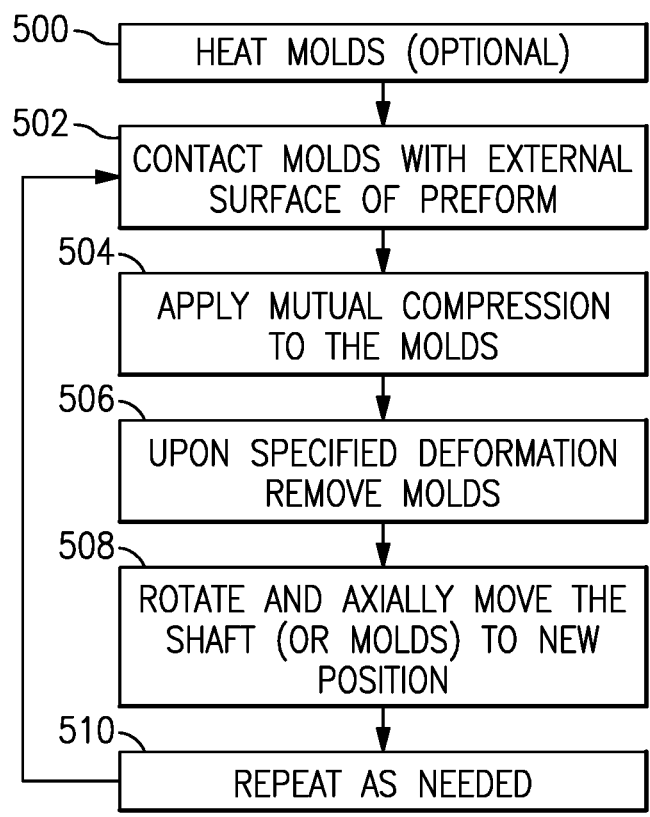
FIG. 11 is a flowchart.

FIG. 11 is a flowchart of the methods as disclosed.

In an initial step, molds are heated at step 500. Those molds are brought into contact with external surfaces of a shaft preform at step 502.

Compression is applied to the mold or molds at step 504.

Upon specified deformation being achieved, the molds are removed at step 506.

Portions of the mold may be rotated and/or moved axially to a new position at step 508. The method then returns to step 502 and is repeated as many times as necessary at step 510.

FIG. 12A shows optional additional details of a mold embodiment as a diametric cross-sectional view. The molds 524 are the external heated molds such as described above. While generally cylindrical and straight molds are illustrated here, the methods to be described would also apply to the more curved molds such as shown in FIG. 10A.

The shaft preform 520 receives an internal molding support 522. Support 522 has radially outer extending portions 525 with intermediate spaces 523.

In a step illustrated in FIG. 12B as an axial cross-sectional view, the portions 525 are axially and circumferentially aligned with an area where it is desirable to form the grooves from the heated molds 524. As can be appreciated in this view, the internal support 522 actually has spaced parts 521 and 519 having internal faces 527 to deform an internal space 529. A control for the mold would move the internal support 522 such that space 529 is axially aligned with the molds 524.

As shown in the step of FIG. 12C as an axial cross-sectional view, compression is then applied to the heated mold portions 524 and grooves 529 and 530 are formed in the shaft preform 520, with the molds deforming the preform into grooves 530 and 529.

FIG. 12D shows an axial cross-sectional view of a subsequent step. After the grooves 530 and 529 are formed, the internal support 522 may be rotated circumferentially such that the spaces or areas 523 are now aligned with the grooves 530 and 529. This allows the mold to be moved axially as shown in FIG. 12E, and such that the portions 525 now extend into and out of the plane of FIG. 12E. Molds 524 can be moved or arranged to be aligned circumferentially with the location of the enlarged portions 525 such that a second group of grooves can be formed.

As an example and returning to FIG. 1, method step 12C may form, say the groove pairs 28, whereas method 12E may form the groove pairs 30. Of course, if more than two sets of grooves are formed, more than two steps and rotations will be utilized.

A motor 600 is shown schematically to rotate and move the support 522 axially. Alternatively, the preform could be moved. An appropriate control can operate to control the support 522 and the heated molds in cooperation to form the grooves.

Figure 13A:
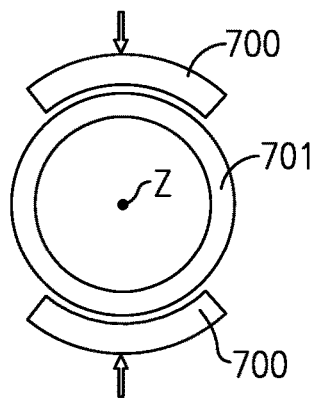
FIG. 13A shows a first heated mold option.
Figure 13B:
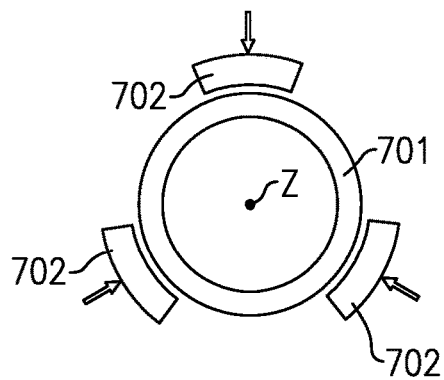
FIG. 13B shows an alternative heated mold option.
Figure 13C:
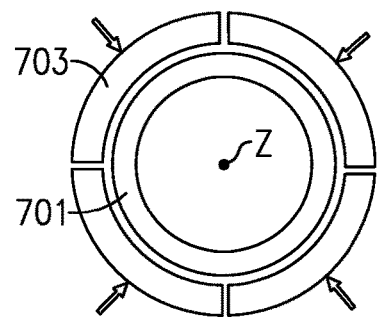
FIG. 13C shows yet a third heated mold option.

FIGS. 13A-13C show diametric cross-sectional views. FIG. 13A shows a method embodiment wherein there are two heated molds 700 spaced about a tubular preform 701.

FIG. 13B shows an embodiment wherein there are three heated molds 702 spaced circumferentially about a preform 701.

FIG. 13C shows an embodiment wherein there are four heated molds 703 spaced about a preform 701. It should be understood that the embodiments of FIG. 13A, 13B, or 13C may also form a groove which extends about the entire 360° in the circumferential direction if needed.

Figure 14A:
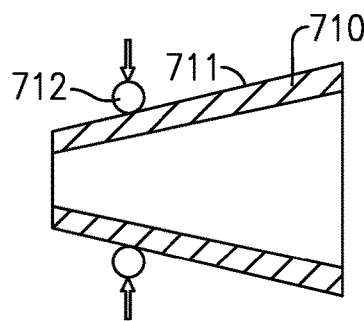
FIG. 14A show a component which may be formed by the methods disclosed in this application which may be for a use other than a drive shaft.
Figure 14B:
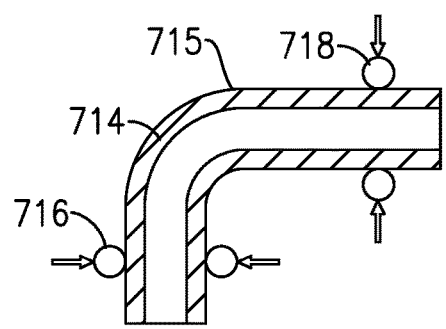
FIG. 14B shows yet another component which may be formed by the methods of this application.

FIGS. 14A and 14B show axial cross-sectional views. FIG. 14A shows a non-cylindrical component 710 which may be made with the methods as described above. Grooves are formed into an outer surface 711 by heated molds 712 in a manner similar to that disclosed above. The component 710 could be any number of aerospace components, or could be components for other applications.

FIG. 14B shows a non-cylindrical component 714 with curved segments. Heated molds 716 and 718 are applied to form grooves into an outer peripheral surface 715, again according to methods as described above.

A drive shaft could be said to include a tubular portion extending between axial ends and being hollow. There are deformations 28/30/17 extending from an outer peripheral surface of the cylindrical shaft portion. The deformations extend for a circumferential extent that is less than 180° about a central axis of the tubular portion. Deformations in one of the axially spaced extents extend between first circumferential ends and deformations in a second of the axially spaced groove sets extend between second circumferential ends and the deformations in the second axially spaced sets extend at least partially in a circumferential space between the first circumferential ends.

Methods, such as disclosed above, are claimed in co-pending U.S. patent application Ser. No. 16/247,928, filed on even date herewith, and entitled "Methods of Making Components."

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A drive shaft comprising:
a tubular portion extending between axial ends and being hollow, and there being deformations on the tubular portion, said deformations extending for a circumferential extent that is less than 180° about a central axis of said tubular portion;
wherein there are plural lesser distance deformation portions in spaced axial locations between said axial ends of said tubular portion, with each having a plurality of deformations axially spaced by a first distance; and
wherein there is at least one greater distance deformation portion having deformations, and said at least one greater distance deformation portion axially between a pair of said greater deformation portions, wherein said first distance is less than a second axial distance between said deformations in said at least one greater distance deformation portion.

2. The drive shaft of claim 1, wherein said deformations are detents.

3. The drive shaft as set forth in claim 1, wherein said deformations in said plural lesser distance deformation portions include at least two axially spaced deformation sets, with a first of said axially spaced deformation sets having deformations extending between first set circumferential ends and said deformations in a second of said axially spaced deformation sets extending between second set circumferential ends and said deformations in said second axially spaced deformation sets extend at least partially in a circumferential space between said first circumferential ends.

4. The drive shaft as set forth in claim 3, wherein there are two circumferentially spaced ones of said deformations in each of said axially spaced deformation sets.

5. The drive shaft as set forth in claim 4, wherein there are three or more circumferentially spaced deformations in each of said axially spaced sets.

6. The drive shaft as set forth in claim 3, wherein there are at least three of said axially spaced deformation sets having deformations extending through a common circumferential extent.

7. The drive shaft as set forth in claim 1, wherein said deformations are formed to be generally tangent to a radius from said central axis.

8. The drive shaft as set forth in claim 1, wherein said deformations are formed to have a central location which extends radially further away from said central axis.

9. The drive shaft as set forth in claim 1, wherein there are axially spaced deformation sets and there are at least two circumferentially spaced deformations in each of said axially spaced deformation sets.

10. The drive shaft as set forth in claim 9, wherein there are at least three of said deformations in each of said axially spaced deformation sets.

11. The drive shaft as set forth in claim 1, wherein said deformations are detents with a generally concave shape formed about a single radius in a cross-section taken through a diameter of said tubular portion.

12. The drive shaft as set forth in claim 1, wherein said detents have a generally concave shape through a plane taken through a diameter of said tubular portion, and wherein there are convex segments spaced on each end of said concave portion.

13. The drive shaft as set forth in claim 1, wherein said deformations are detents having a generally linear surface in a plane taken through a diameter of said tubular portion with shapes at each axial end of said generally linear portion which are at least one of convex and concave shapes.

* * * * *